United States Patent
DeLuca et al.

(10) Patent No.: US 10,956,949 B2
(45) Date of Patent: Mar. 23, 2021

(54) DYNAMIC RETURN/SELL BACK PRICING BASED ON PRODUCT USAGE

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 15/833,490

(22) Filed: Dec. 6, 2017

(65) Prior Publication Data

US 2019/0172104 A1  Jun. 6, 2019

(51) Int. Cl.
*G06Q 20/08* (2012.01)
*G06Q 20/10* (2012.01)
*G06Q 20/40* (2012.01)
*G06Q 30/02* (2012.01)

(52) U.S. Cl.
CPC ....... *G06Q 30/0283* (2013.01); *G06Q 20/407* (2013.01)

(58) Field of Classification Search
CPC .............. G06Q 20/208; G06Q 30/0283; G06Q 20/407; G06Q 20/201
See application file for complete search history.

(56) References Cited

U.S. PATENT DOCUMENTS

| | | |
|---|---|---|
| 2009/0045258 A1 | 2/2009 | Sabeta |
| 2011/0264478 A1 | 10/2011 | Yukiyoshi |
| 2015/0213420 A1* | 7/2015 | Krishnamurthy ...... G06Q 30/06 705/39 |
| 2016/0148184 A1 | 5/2016 | Iso et al. |

\* cited by examiner

*Primary Examiner* — Scott S Trotter
(74) *Attorney, Agent, or Firm* — Schmeiser, Olsen & Watts; Stephanie Carusillo

(57) ABSTRACT

An approach is provided for determining a price of a product. After a purchase of the product, data specifying usage of the product is obtained. The data is being collected by one or more sensors coupled to the product. Based on the data specifying the usage, a price of the product is determined for a return of the product or a sell back of the product.

14 Claims, 6 Drawing Sheets

DYNAMIC RETURN/SELL BACK PRICING BASED ON PRODUCT USAGE

BACKGROUND

The present invention relates to managing pricing, and more particularly to determining a price of a product being returned or sold back as a used product.

Known return policies offered by retailers include an all or nothing return policy for the acceptance of returns that have been used. The all or nothing return policy may include requiring the item to be returned in its original packaging, be in a like-new condition, and be returned within a specified period of time from the purchase date or the first usage of the item. A person, however, often purchases an item as a gift that is not first used for a long period of time after the purchase date because the person presents the item to its recipient on a date of an event that is a long period of time after the purchase date, such as the date of a birthday, anniversary, graduation, etc. Because the period of time between the purchase date and the date of the gift-giving event may exceed the specified period of time in the return policy, the recipient may not be able to return the item based on the return policy. In other cases, various individuals may use a product at different degrees of usage before returning the product, making it difficult for the retailer to assess whether the returned product is in a like-new condition. The retailer may make a subjective determination about whether a returned product is in a like-new condition.

Many products are embedded with sensors that capture data which indicates the particular features of the products that a person has or has not used. Furthermore, a person who initiates a return of a product may not have used all the features of the product and therefore may not realize that the product has a particular feature or that a particular feature is appealing to the person.

SUMMARY

In one embodiment, the present invention provides a method of determining a price of a product. The method includes after a purchase of the product, a computer obtaining data specifying usage of the product. The data is being collected by one or more sensors coupled to the product. The method further includes based on the data specifying the usage, the computer determining a price of the product for a return of the product or a sell back of the product.

In another embodiment, the present invention provides a computer program product including a computer readable storage medium and computer readable program code stored in the computer readable storage medium. The computer readable program code contains instructions that are executed by a central processing unit (CPU) of a computer system to implement a method of determining a price of a product. The method includes after a purchase of the product, the computer system obtaining data specifying usage of the product. The data is being collected by one or more sensors coupled to the product. The method further includes based on the data specifying the usage, the computer system determining a price of the product for a return of the product or a sell back of the product.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of determining a price of a product. The method includes after a purchase of the product, the computer system obtaining data specifying usage of the product. The data is being collected by one or more sensors coupled to the product. The method further includes based on the data specifying the usage, the computer system determining a price of the product for a return of the product or a sell back of the product.

In another embodiment, the present invention provides a method of generating and presenting a pre-return alert. The method includes after an initiation of a process via an e-commerce system to return a product, a computer receives data about usage of the product. The usage of the product had been monitored by one or more sensors coupled to the product. The method further includes based on the usage of the product, the computer generating an alert whose content encourages the user to keep using the product or use a feature of the product, rather than returning the product. The method further includes the computer presenting the alert to the user. In other embodiments, the present invention provides a computer program product and a computer system that are analogous to the aforementioned method of generating and presenting the pre-return alert.

Embodiments of the present invention provide a data-driven and evidence-based decision for determining a price for a return or sell back of a product. Furthermore, the price for the return or sell back of the sensor-enabled product is determined dynamically based on the product's sensors continuously providing data about usage of the product.

DETAILED DESCRIPTION

Overview

Embodiments of the present invention determine a price of a product based on usage of the product and generate a pre-return alert based on usage of the product. In one embodiment, a shopper is presented with a dynamic return or sell back price based on the usage of a sensor-enabled device. In one embodiment, a user is presented with an alert when the user is attempting to return an item, where the alert notifies the user about a feature of the item that (i) the user has not used (or has used rarely) and (ii) may be appealing to the user, and entices the user to use the feature, thereby causing the user to decide to keep the item rather than return the item.

System for Determining a Price of a Product and Generating a Pre-Return Alert

Figure 1:
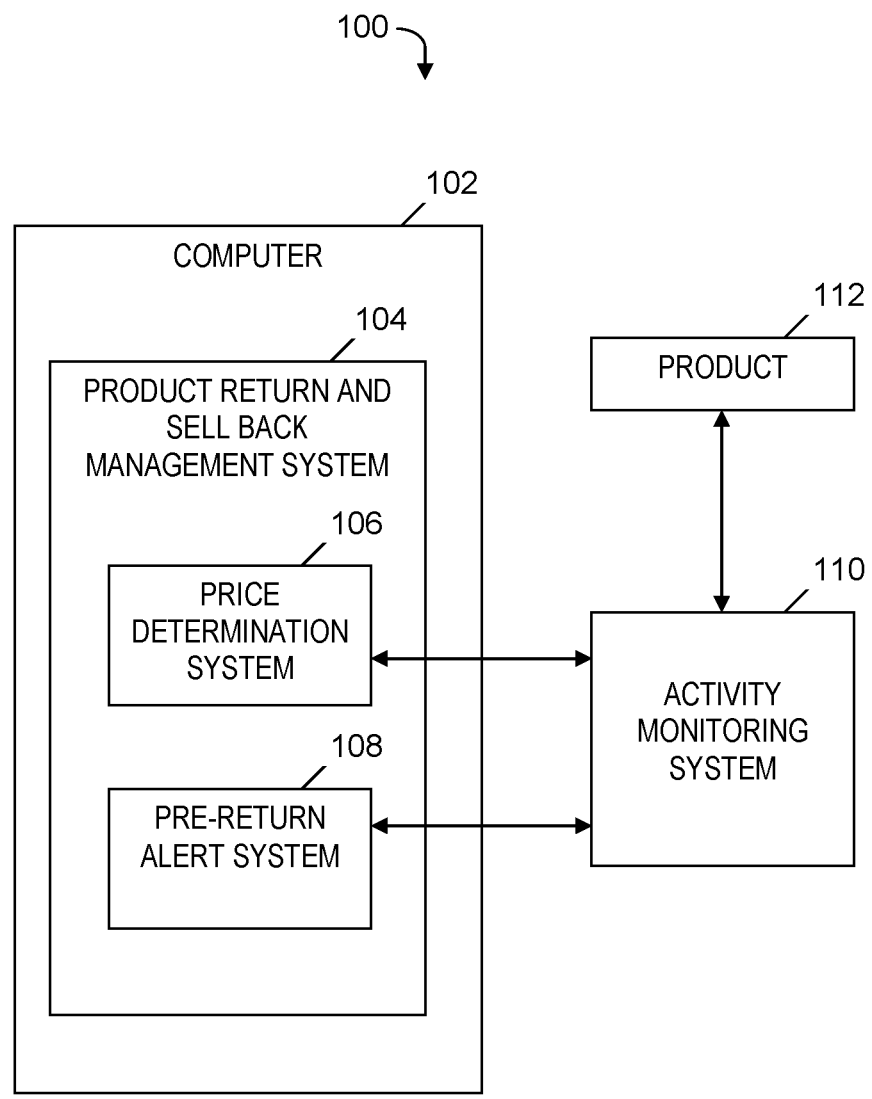
FIG. 1 is a block diagram of a system for determining a price of a product and generating a pre-return alert, in accordance with embodiments of the present invention.

FIG. 1 is a block diagram of a system 100 for determining a price of a product and generating a pre-return alert, in accordance with embodiments of the present invention. System 100 includes a computer 102, which executes a software-based product return and sell back management system 104, which includes a price determination system 106 and a pre-return alert system. In one embodiment, product return and sell back management system 104 is part of an e-commerce system. Price determination system 106 obtains data from an activity monitoring system 110, where the data specifies usage of a product 112, which is a sensor-enabled product. Activity monitoring system 110 is software executed by computer 102 or another computer (not shown) and provides an activity monitoring service. The usage of product 112 is monitored by one or more sensors (not shown) coupled to product 112, which send data specifying the usage of product 112 (see FIG. 1), movement of product 112 (see FIG. 1), and ambient conditions experienced by product 112 (see FIG. 1) to activity monitoring system 110. Price determination system 106 determines a price of product 112 for a return or a sell back of product 112, where the price is based on the data that specifies the usage of product 112.

Pre-return alert system 108 obtains data from activity monitoring system 110, where the data specifies usage of product 112. Again, the usage of product 112 is monitored by one or more sensors (not shown) coupled to product 112, which send data specifying the usage to activity monitoring system 110. After a user of product 112 initiates a process to return product 112, pre-return alert system 108 generates an alert whose content entices the user to keep using product 112 and/or use a particular feature of product 112, rather than returning product 112.

In one alternate embodiment, system 100 is altered so that product return and sell back management system 104 includes price determination system 106, but does not include pre-return alert system 108 and does not provide the functionality of pre-return alert system 108.

In another alternate embodiment, system 100 is altered so that product return and sell back management system 104 includes pre-return alert system 108, but does not include price determination system 106 and does not provide the functionality of price determination system 106.

The functionality of the components shown in FIG. 1 is described in more detail in the discussion of FIG. 2, FIG. 3, FIG. 4, FIG. 5, and FIG. 6 presented below.

Process for Determining a Price of a Product Based on Product Usage

Figure 2:
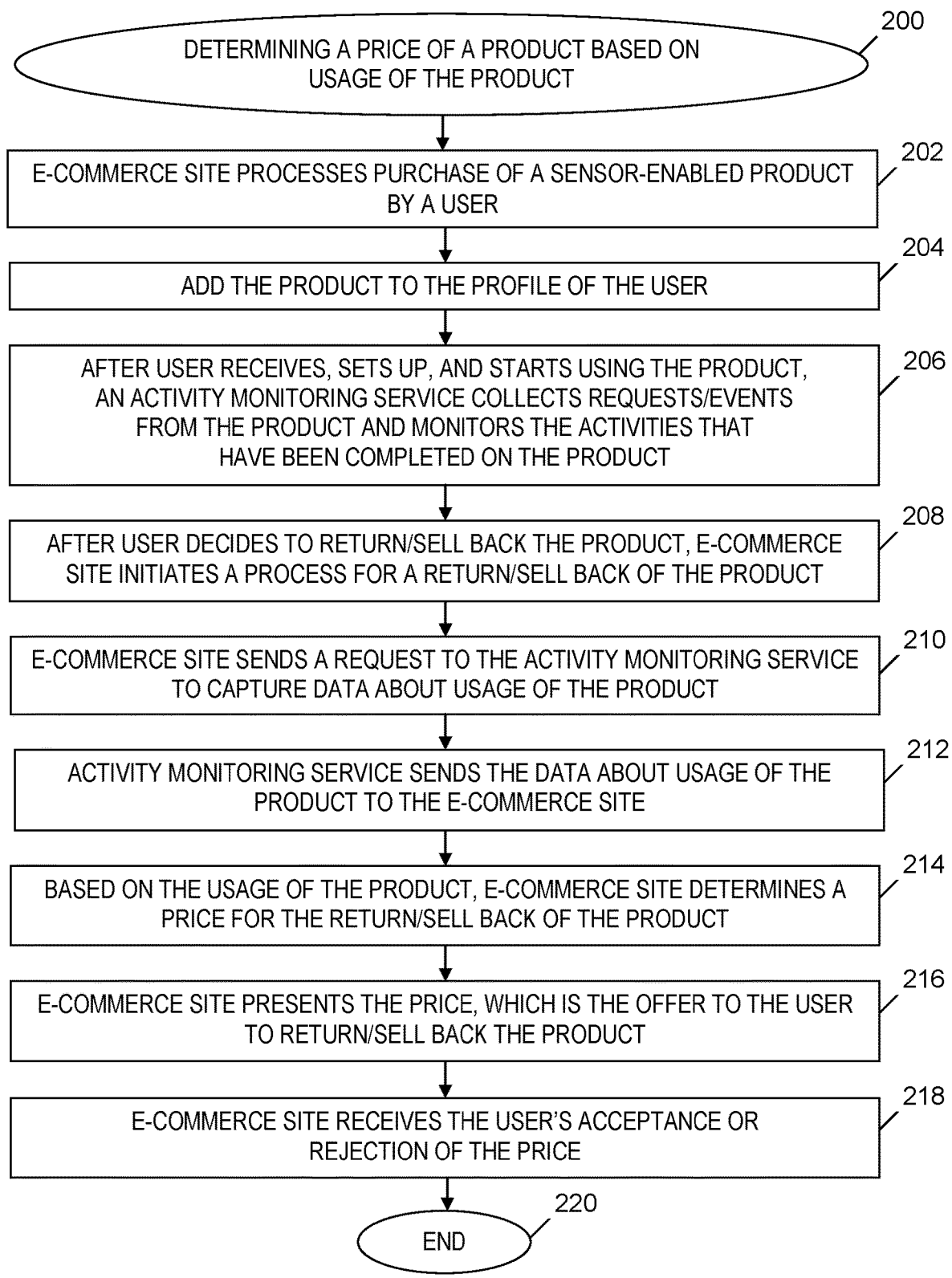
FIG. 2 is a flowchart of a process of determining a price of a product, where the process is implemented by the system of FIG. 1, in accordance with embodiments of the present invention.

FIG. 2 is a flowchart of a process of determining a price of a product, where the process is implemented by the system of FIG. 1, in accordance with embodiments of the present invention. The process of FIG. 2 starts at step 200. In step 202, price determination system 106 (see FIG. 1) processes a purchase of product 112 (see FIG. 1) by a user. In one embodiment, the purchase of product 112 (see FIG. 1) is performed via an e-commerce website.

In step 204, price determination system 106 (see FIG. 1) adds an identification of the product to a profile of the user. For example, product 112 (see FIG. 1) is an intelligent personal assistant and price determination system 106 (see FIG. 1) adds the serial number of the intelligent personal assistant to the profile of the user who purchased the intelligent personal assistant. As another example, price determination system 106 (see FIG. 1) adds a general name of the intelligent personal assistant to the user's profile.

Prior to step 206, product 112 (see FIG. 1) is shipped to and picked up by the user. In step 206, after the purchase of product 112 (see FIG. 1) and after the user receives, sets up, and starts using product 112 (see FIG. 1), an activity monitoring service provided by activity monitoring system 110 (see FIG. 1) collects requests and/or events from product 112 (see FIG. 1) and monitors the activities that have been completed via usage of product 112 (see FIG. 1) and detected by sensor(s) coupled to product 112 (see FIG. 1). The activity monitoring service may also monitor movements of product 112 (see FIG. 1) and ambient conditions that have been detected by sensor(s) coupled to product 112 (see FIG. 1). For example, product 112 (see FIG. 1) is a wearable device and the activity monitoring service uses cloud application programming interface (API) calls to collect data about steps taken, miles walked, etc. that is transmitted from the wearable device over the cloud. As another example, product 112 (see FIG. 1) is a device synchronized with other devices and data from a sensor reading for the device is first shared with a primary device with which it is synchronized and the primary device passes the data to the activity monitoring service.

In step 208, after the user decides to return or sell back product 112 (see FIG. 1), price determination system 106 (see FIG. 1) initiates a process for the return or sell back of product 112 (see FIG. 1). For example, the user initiates the process for the return by visiting the e-commerce website at which the purchase of product 112 (see FIG. 1).

In step 210, price determination system 106 (see FIG. 1) sends a request to activity monitoring system 110 (see FIG. 1) to capture data specifying usage of product 112 (see FIG. 1) by the user.

In step 212, activity monitoring system 110 sends to price determination system 106 (see FIG. 1) the data specifying the usage of product 112 (see FIG. 1).

In step 214, based on the data specifying the usage of product 112 (see FIG. 1), price determination system 106 (see FIG. 1) determines a price for the return or sell back of product 112 (see FIG. 1). In embodiments of the present invention, the price determined in step 214 is based on (i) the number of activities monitored by the sensor(s) coupled to product 112 (see FIG. 1), (ii) a frequency of activities monitored by the sensor(s), (iii) types of activities monitored by the sensor(s), or (iv) any combination of the aforementioned items (i), (ii), and (iii).

In step 216, price determination system 106 (see FIG. 1) presents to the user the price determined in step 214. The price is an offer to the user to return or sell back product 112 (see FIG. 1).

In step 218, price determination system 106 (see FIG. 1) receives the user's acceptance or rejection of the price presented in step 216. If the user accepts the price, then price determination system 106 (see FIG. 1) completes the return or sell back of product 112 (see FIG. 1) by refunding the price to the user in the case of a return, or by transferring to the user a payment whose value is the price in the case of a sell back. After step 218, the process of FIG. 2 ends at step 220.

In one embodiment, price determination system 106 (see FIG. 1) receives from an e-commerce administrator the price to be offered to the user. For example, if product 112 (see FIG. 1) is a toaster and the user activated only the "toast" function of the toaster, the administrator may offer a return price equal to the original purchase price decreased by five dollars. As another example, if the toaster was used 50 times in the period of time from the purchase to the initiation of the return, the administrator may offer a return price of the original purchase price decreased by ten dollars because the toaster was used heavily.

In one embodiment, the user may initiate a sell back process with Retailer 1 to view a first sell back price and also initiate a sell back process with Retailer 2 (i.e., a retailer different form Retailer 1) to view a second sell back price and then compare the two sell back prices and accept the higher price. For example, Retailer 1 may offer a sell back price of $10 for a toaster that has been used once, but Retailer 2 may offer a sell back price of $12 for the same toaster with the same usage. The user may accept the sell back price of $12 from Retailer 2 because $12 is greater than the $10 sell back price offered by Retailer 1.

Figure 3:
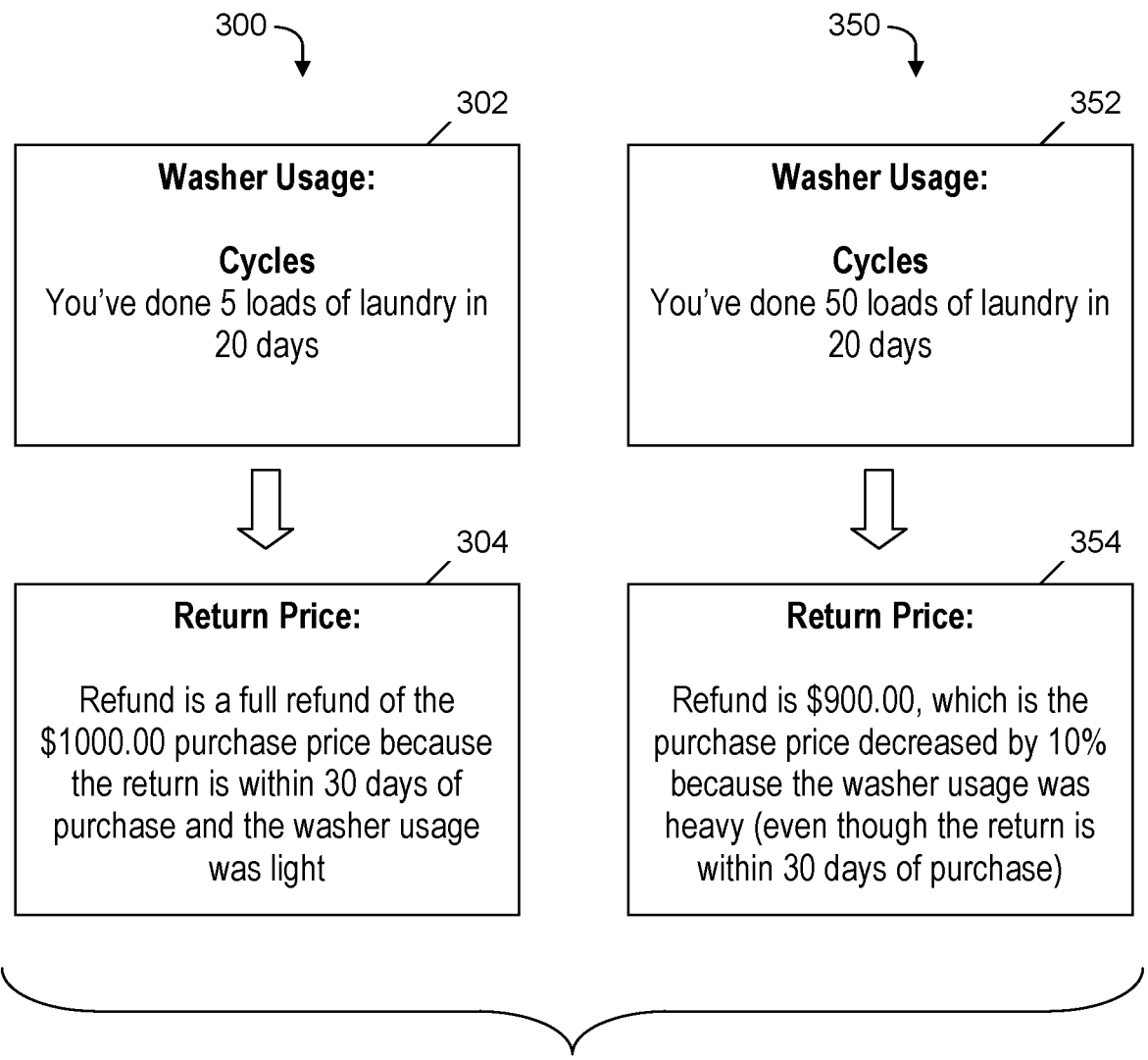
FIG. 3 is an example of determining a price of a product using the process of FIG. 2, in accordance with embodiments of the present invention.

FIG. 3 depicts examples 300 and 350 of determining a price of a product using the process of FIG. 2, in accordance with embodiments of the present invention. In examples 300 and 350, Customer M purchases a new washing machine for $1000.00. The washing machine has sensors and connects to the Internet to share usage information and provides features to Customer M, such as allowing a smartphone to display how much time is left until a current washing machine cycle is complete. After 20 days of using the washing machine, Customer M is not satisfied with the washing machine and she initiates a process for returning the washing machine.

In example 300, activity monitoring system 110 (see FIG. 1) sends washer usage data 302 specifying cycles of laundry performed in the 20 days since Customer M started using the machine. Washer usage data 302 indicates that Customer M has used the washing machine lightly, doing five loads of laundry in the 20 days. Data 302 is an example of data that is sent in step 212 in FIG. 2.

In example 300, based on washer usage data 302, price determination system 106 (see FIG. 1) determines a return price 304, which is a full refund of the $1000.00 purchase price of the washing machine. Price determination system 106 (see FIG. 1) determined a full refund as return price 304 because the return is within 30 days of the purchase of the washing machine and the washing machine usage by Customer M was light during the 20 days. The washer usage data 302 being collected and made available to price determination system 106 (see FIG. 1) and return price 304 being a full refund is in accordance with terms that Customer M agreed to at the time of the purchase of the washing machine. Determining return price 304 is an example of step 214 in FIG. 2.

As an extension (not shown) to example 300, suppose Customer M decides she wants to keep using the washing machine instead of completing the return. Customer M uses the washing machine for seven more days (i.e., a total of 27 days) and then re-initiates a return process. Activity monitoring system 110 (see FIG. 1) sends updated washer usage data (not shown) specifying cycles of laundry performed in the 27 days since Customer M started using the machine. The updated washer usage data indicates that Customer M has used the washing machine at a medium level of usage. Based on the updated washer usage data, price determination system 106 (see FIG. 1) determines an updated return price (not shown), which may be less than a full refund of the $1000.00 purchase price of the washing machine because the washing machine usage by Customer M was at a medium level during the 27 days since the purchase.

In example 350, activity monitoring system 110 (see FIG. 1) sends washer usage data 352 specifying cycles of laundry performed in the 20 days since Customer M started using the machine. Washer usage data 352 indicates that Customer M has used the washing machine heavily, doing 50 loads of laundry in the 20 days. Washer usage data 352 is an example of data that is sent in step 212 in FIG. 2.

In example 350, based on washer usage data 352, price determination system 106 (see FIG. 1) determines a return price 354, which is $900.00 (i.e., the $1000.00 purchase price of the washing machine decreased by a penalty restocking fee of 10%). Price determination system 106 (see FIG. 1) determined $900.00 as return price 354 because the washing machine usage was heavy during the 20 days after the purchase (even though the return is within 30 days of the purchase of the washing machine). The return price 354 being the purchase price decreased by 10% is in accordance with terms specified and agreed to by Customer M at the time of the purchase of the washing machine. Determining return price 354 is an example of step 214 in FIG. 2.

Process for Generating a Pre-Return Alert

Figure 4:
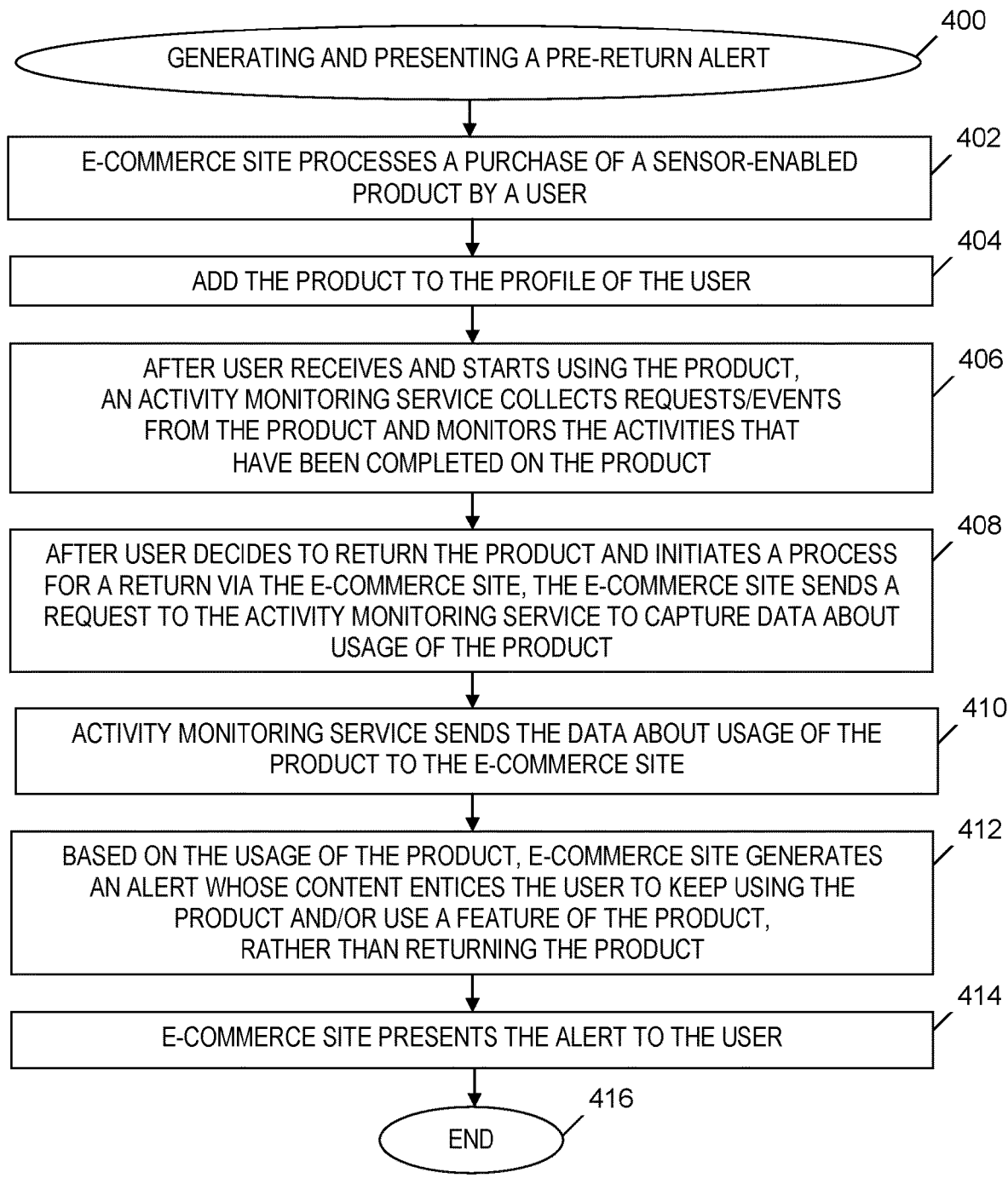
FIG. 4 is a flowchart of a process of generating a pre-return alert, where the process is implemented by the system of FIG. 1, in accordance with embodiments of the present invention.

FIG. 4 is a flowchart of a process of generating a pre-return alert, where the process is implemented by the system of FIG. 1, in accordance with embodiments of the present invention. The process of FIG. 4 starts at step 400. In step 402, pre-return alert system 108 (see FIG. 1) processes a purchase of product 112 (see FIG. 1) by a user. In one embodiment, the purchase of product 112 (see FIG. 1) is performed via an e-commerce website.

In step 404, pre-return alert system 108 (see FIG. 1) adds an identification of product 112 (see FIG. 1) to the profile of the user. For example, product 112 (see FIG. 1) is an intelligent personal assistant and price determination system 106 (see FIG. 1) adds the serial number of the intelligent personal assistant to the profile of the user who purchased the intelligent personal assistant. As another example, price determination system 106 (see FIG. 1) adds a general name of the intelligent personal assistant to the user's profile.

In step 406, after the user receives and starts using product 112 (see FIG. 1), an activity monitoring service provided by activity monitoring system 110 (see FIG. 1) collects requests and/or events from product 112 (see FIG. 1) and monitors activities that have been completed via usage of product 112 (see FIG. 1) and detected by sensor(s) coupled to product 112 (see FIG. 1).

In step 408, after the user decides to return product 112 (see FIG. 1) and initiates a process for returning product 112 (see FIG. 1) via product return and sell back management system 104 (see FIG. 1), pre-return alert system 108 (see FIG. 1) sends a request to activity monitoring system 110 (see FIG. 1) to capture data specifying usage of product 112 (see FIG. 1). In one embodiment, the return of product 112 (see FIG. 1) is initiated via the e-commerce website from which product 112 (see FIG. 1) was purchased by the user. In one embodiment, pre-return alert system 108 (see FIG. 1) captures the data specifying the usage of product 112 (see FIG. 1) by an OAuth granting of access by the user to the data monitored by the sensor(s) coupled to product 112 (see FIG. 1) either at the time of the purchase of product 112 (see FIG. 1) or during the process of returning product 112 (see FIG. 1).

In step 410, activity monitoring system 110 (see FIG. 1) sends the data specifying the usage of product 112 (see FIG. 1) to pre-return alert system 108 (see FIG. 1).

In step 412, based on the data specifying the usage of product 112 (see FIG. 1), pre-return alert system 108 (see FIG. 1) generates an alert whose content entices the user to keep using product 112 (see FIG. 1) and/or use a specified feature of product 112 (see FIG. 1), rather than returning product 112 (see FIG. 1). The content of the alert may specify:

(1) a feature of product 112 (see FIG. 1) that has not been used by the user (2) a feature of product 112 (see FIG. 1) that has not been used frequently by the user (i.e., has been used at a frequency which is less than a predefined threshold frequency)

(3) a feature of product 112 (see FIG. 1) that is used frequently by other users but has never been used or has been used only rarely by the user (i.e., the other users have used the feature at a frequency that exceeds a predefined threshold frequency)

(4) a threshold amount of time has been exceeded before a feature of product 112 (see FIG. 1) has been used by the user (5) feature(s) of product 112 (see FIG. 1) that may be of interest to the user based on information in the user's social media account (6) feature(s) of product 112 (see FIG. 1) that may be of interest to the user based on the user's recent purchases (i.e., purchases that occurred in a predefined amount of time prior to the purchase of product 112 (see FIG. 1))

(7) featured(s) of product 112 (see FIG. 1) that may be of interest to the user based on the user's recent app downloads In step 414, pre-return alert system 108 (see FIG. 1) presents to the user the alert generated in step 412. The alert may allow the user to cancel the process of returning product 112 (see FIG. 1). The alert may provide an incentive to the user to use a feature of product 112 (see FIG. 1) that the user has not ever used (e.g., "Reach 10,000 steps on your activity tracker this week and you will earn a $5 gift card. You can still return the activity tracker after the week if you are still unsatisfied."). The alert may provide more information about a feature of product 112 (see FIG. 1) so that the user can learn about the feature. The alert may provide additional evidence about why a feature of product 112 (see FIG. 1) may be useful to the user (e.g., "We see you own Intelligent Personal Assistant XYZ. Did you know that your smart toaster has functionality that can be utilized by voice experiences of XYZ? You haven't enabled the voice experience of XYZ that interacts with smart toasters."). After step 414, the process of FIG. 4 ends at step 416.

After step 414 and prior to step 416, an optional step (not shown) may include pre-return alert system 108 (see FIG. 1) presenting a follow-up notification based on whether the user has taken an action in response to the alert presented in step 414. For example, the follow-up notification may include a push notification to the user's mobile device reminding the user to use the feature that had been identified in the alert presented in step 414. Instead of a follow-up notification, the optional step may include a follow-up smart action, such as automatically triggering a feature on product 112 (see FIG. 1).

In one embodiment, pre-return alert system 108 (see FIG. 1) performs the following steps:

(1) determine a first pattern of usage by a first user of product 112 (see FIG. 1) based on data collected by activity monitoring system 110 (see FIG. 1) from sensor(s) coupled to product 112 (see FIG. 1);

(2) determine that the first user may return product 112 (see FIG. 1) based at least in part on a comparison between the first pattern of usage and a second pattern of usage of other users that have previously returned a product that matches product 112 (see FIG. 1) (i.e., a product whose make and model matches the make and model of product 112 (see FIG. 1));

(3) identify at least one feature of product 112 (see FIG. 1) that (i) was not used by the first user and (ii) was used by users that kept (i.e., did not return) a product that matches product 112 (see FIG. 1);

(4) based on (i) the identified at least one feature, (ii) customer feedback regarding products that match product 112 (see FIG. 1), and (iii) information regarding preferences of the first user, generate a notification that includes information about the at least one feature; and (5) send the notification to the first user before the first user completes a return of product 112 (see FIG. 1).

Figure 5:
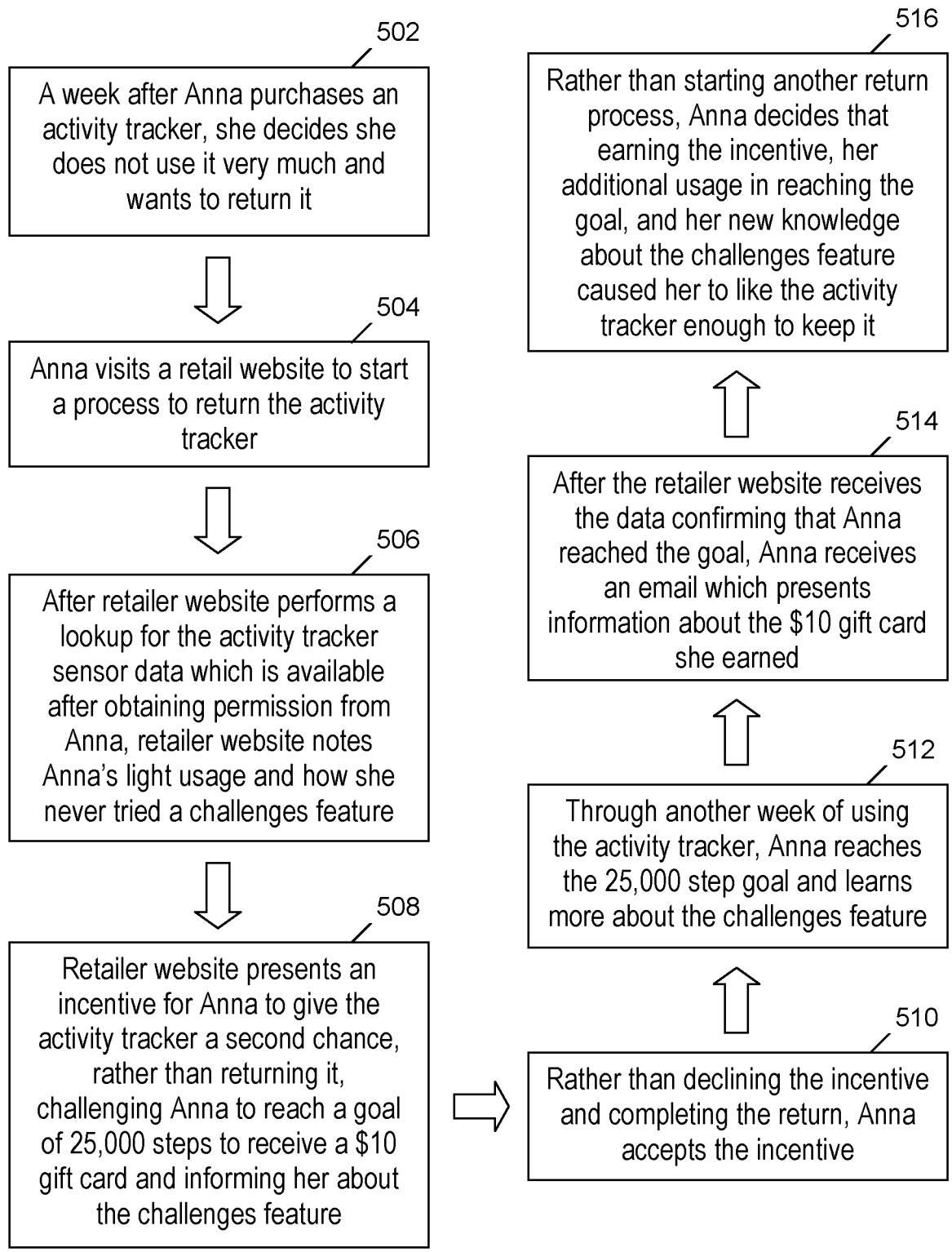
FIG. 5 is an example of generating a pre-return alert using the process of FIG. 4, in accordance with embodiments of the present invention.

FIG. 5 is an example of generating a pre-return alert using the process of FIG. 4, in accordance with embodiments of the present invention. In step 502, a week after Anna purchases an activity tracker, she decides she does not use very much and wants to return it. In step 504, Anna visits a retail website to start a process to return the activity tracker, via pre-return alert system 108 (see FIG. 1).

In step 506, after the retailer website performs a lookup for the activity tracker sensor data, pre-return alert system 108 (see FIG. 1) notes Anna's light usage of the activity tracker and determines that Anna has never used a challenges feature of the activity tracker. The sensor data is available to pre-return alert system 108 (see FIG. 1) based on permission obtained from Anna at the time of purchasing the activity tracker.

In step 508, the retailer website generates and presents an alert that includes an incentive for Anna to give the activity tracker a second chance, rather than returning it. The incentive challenges Anna to reach a goal of 25,000 steps in the next week to receive a $10 gift card. The alert also informs Anna about the challenges feature of the activity tracker. The alert includes the incentive because pre-return alert system 108 determined that Anna's light usage may be a reason for her wanting to return the activity tracker and that additional usage may convince her to change her decision and keep the activity tracker. Step 508 is an example of steps 412 and 414 (see FIG. 4).

In step 510, rather than declining the incentive and completing the return, Anna accepts the incentive. Pre-return alert system 108 (see FIG. 1) receives an indication from Anna that Anna accepts the incentive. In step 512, through another week of using the activity tracker, Anna reaches the 25,000 step goal and learns more about the challenges feature.

In step 514, after the retailer website receives the data confirming that Anna reached the goal, Anna receives an email which presents information about obtaining the $10 gift card that she earned by reaching the goal.

In step 516, rather than starting another return process, Anna decides that earning the incentive, her additional usage in reaching the goal, and her new knowledge about the challenges feature caused here to like the activity tracker enough to keep it.

Computer System

Figure 6:
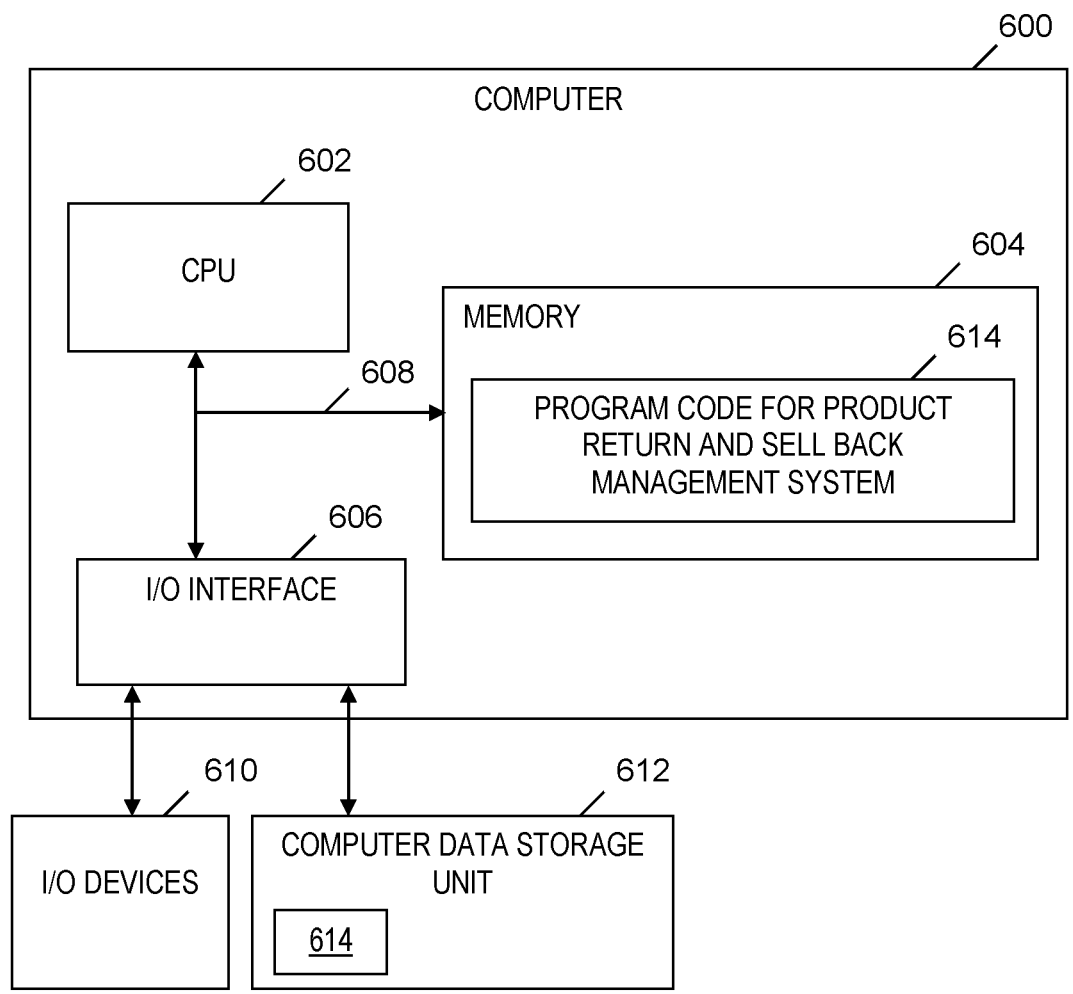
FIG. 6 is a block diagram of a computer that is included in the system of FIG. 1 and that implements the process of FIG. 2 and the process of FIG. 4, in accordance with embodiments of the present invention.

FIG. 6 is a block diagram of a computer 102 that is included in the system of FIG. 1 and that implements the process of FIG. 2 and the process of FIG. 4, in accordance with embodiments of the present invention. Computer 102 is a computer system that generally includes a central processing unit (CPU) 602, a memory 604, an input/output (I/O) interface 606, and a bus 608. Further, computer 102 is coupled to I/O devices 610 and a computer data storage unit 612. CPU 602 performs computation and control functions of computer 102, including executing instructions included in program code 614 to perform a method of determining a price of a product and generating a pre-return alert, where the instructions are executed by CPU 602 via memory 604. CPU 602 may include a single processing unit, or be distributed across one or more processing units in one or more locations (e.g., on a client and server). In one alternate embodiment, program code 614 includes instructions that when executed by CPU 602 via memory 604 determine a price of a product but do not generate a pre-return alert. In another alternate embodiment, program code 614 includes instructions that when executed by CPU 602 via memory 604 generate a pre-return alert, but do not determine a price of a product.

Memory 604 includes a known computer readable storage medium, which is described below. In one embodiment, cache memory elements of memory 604 provide temporary storage of at least some program code (e.g., program code 614) in order to reduce the number of times code must be retrieved from bulk storage while instructions of the program code are executed. Moreover, similar to CPU 602, memory 604 may reside at a single physical location, including one or more types of data storage, or be distributed across a plurality of physical systems in various forms. Further, memory 604 can include data distributed across, for example, a local area network (LAN) or a wide area network (WAN).

I/O interface 606 includes any system for exchanging information to or from an external source. I/O devices 610 include any known type of external device, including a display, keyboard, etc. Bus 608 provides a communication link between each of the components in computer 102, and may include any type of transmission link, including electrical, optical, wireless, etc.

I/O interface 606 also allows computer 102 to store information (e.g., data or program instructions such as program code 614) on and retrieve the information from computer data storage unit 612 or another computer data storage unit (not shown). Computer data storage unit 612 includes a known computer-readable storage medium, which is described below. In one embodiment, computer data storage unit 612 is a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 that includes instructions that are executed by CPU 602 via memory 604 to determine a price of a product and generate a pre-return alert. Although FIG. 6 depicts memory 604 as including program code, the present invention contemplates embodiments in which memory 604 does not include all of code 614 simultaneously, but instead at one time includes only a portion of code 614.

Further, memory 604 may include an operating system (not shown) and may include other systems not shown in FIG. 6.

Storage unit 612 and/or one or more other computer data storage units (not shown) may include data received from activity monitoring system 110, and which includes data from sensor(s) coupled to product 112 (see FIG. 1) that monitor activities associated with usage of product 112 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to determining a price of a product and generating a pre-return alert. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer 102) including one or more processors (e.g., CPU 602), wherein the processor(s) carry out instructions contained in the code causing the computer system to determine a price of a product and generate a pre-return alert. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of determining a price of a product and generating a pre-return alert.

While it is understood that program code 614 for determining a price of a product and generating a pre-return alert may be deployed by manually loading directly in client, server and proxy computers (not shown) via loading a computer-readable storage medium (e.g., computer data storage unit 612), program code 614 may also be automatically or semi-automatically deployed into computer 102 by sending program code 614 to a central server or a group of central servers. Program code 614 is then downloaded into client computers (e.g., computer 102) that will execute program code 614. Alternatively, program code 614 is sent directly to the client computer via e-mail. Program code 614 is then either detached to a directory on the client computer or loaded into a directory on the client computer by a button on the e-mail that executes a program that detaches program code 614 into a directory. Another alternative is to send program code 614 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 614 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of determining a price of a product and generating a pre-return alert. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 604 and computer data storage unit 612) having computer readable program instructions 614 thereon for causing a processor (e.g., CPU 602) to carry out aspects of the present invention.

The computer readable storage medium can be a tangible device that can retain and store instructions (e.g., program code 614) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 614) described herein can be downloaded to respective computing/processing devices (e.g., computer 102) from a computer readable storage medium or to an external computer or external storage device (e.g., computer data storage unit 612) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 614) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIG. 4) and/or block diagrams (e.g., FIG. 1 and FIG. 6) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 614).

These computer readable program instructions may be provided to a processor (e.g., CPU 602) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 612) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 614) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of determining a price of a product, the method comprising the steps of:
    after a purchase of the product, detecting, by one or more sensors coupled to the product, a count of activities completed by a usage of the product;
    in response to the detecting the count of the activities completed by the usage of the product, sending, by the one or more sensors and to an activity monitoring system, data specifying the usage of the product, the data including the count of the activities completed by the usage of the product as detected by the one or more sensors;
    obtaining, by one or more processors of a price determination system and from the activity monitoring system, the data specifying the usage of the product;
    based on the data specifying the usage including the count of the activities completed by the usage of the product as detected by the one or more sensors, determining, by the one or more processors, a first price of the product for a return of the product or a sell back of the product;
    receiving, by the one or more processors, a first request from a user of the product to return or sell back the product;
    based on the first request being received and in response to the step of determining the first price, presenting, by the one or more processors, the first price to the user for the return or the sell back of the product;
    receiving, by the one or more processors, an indication from the user that the user decides not to return or sell back the product based on the first request;
    subsequent to the step of receiving the indication, obtaining, by the one or more processors, second data specifying an increased usage of the product; and
    based on the second data specifying the increased usage, determining, by the one or more processors, a second price of the product for the return of the product or the sell back of the product, wherein the second price is greater than the first price.

2. The method of claim 1, further comprising the steps of:
    selecting, by the one or more processors, a range of usage from multiple predefined ranges of usage; and
    determining, by the one or more processors, that the usage of the product is included in the selected range of usage,
    wherein the step of determining the first price includes the computer selecting the first price from multiple prices respectively associated with the predefined ranges of usage, based on the usage of the product is included in the selected range.

3. The method of claim 1, further comprising the step of based on the data specifying the usage of the product, determining, by the one or more processors, a frequency of the activities, wherein the step of determining the first price is further based on the frequency of the activities.

4. The method of claim 1, further comprising the step of based on the data specifying the usage of the product, determining, by the one or more processors, types of the activities, wherein the step of determining the first price is further based on the types of the activities.

5. The method of claim 1, further comprising the step of based on the data specifying the usage of the product, determining, by the one or more processors, durations of the activities, wherein the step of determining the first price is further based on the durations of the activities.

6. The method of claim 1, further comprising the step of based on the data specifying the usage of the product, determining, by the one or more processors, a time of day during which the activities are performed by the user as part of the usage of the product, wherein the step of determining the first price is further based on the time of day.

7. The method of claim 1, further comprising the step of:
    providing at least one support service for at least one of creating, integrating, hosting, maintaining, and deploying computer readable program code in the computer, the program code being executed by a processor of the computer to implement the steps of detecting the count of the activities, sending the data specifying the usage, obtaining the data specifying the usage, determining the first price of the product, receiving the first request, presenting the first price to the user, receiving the indication that the user decides not to return or sellback the product, obtaining the second data, and determining the second price.

8. A computer program product, comprising:
    a computer readable storage medium and a computer readable program code stored in the computer readable storage medium, the computer readable program code containing instructions that are executed by a central processing unit (CPU) of a computer system to implement a method of determining a price of a product, the method comprising the steps of:
    after a purchase of the product, detecting, by one or more sensors coupled to the product, a count of activities completed by a usage of the product;
    in response to the detecting the count of the activities completed by the usage of the product, sending, by the one or more sensors and to an activity monitoring system, data specifying the usage of the product, the data including the count of the activities completed by the usage of the product as detected by the one or more sensors;
    the computer system obtaining from the activity monitoring system the data specifying the usage of the product;
    based on the data specifying the usage including the count of the activities completed by the usage of the product as detected by the one or more sensors, the computer system determining a first price of the product for a return of the product or a sell back of the product;
    the computer system receiving a first request from a user of the product to return or sell back the product;
    based on the first request being received and in response to the step of determining the first price, the computer system presenting the first price to the user for the return or the sell back of the product;
    the computer system receiving an indication from the user that the user decides not to return or sell back the product based on the first request;
    subsequent to the step of receiving the indication, the computer system obtaining second data specifying an increased usage of the product; and
    based on the second data specifying the increased usage, the computer system determining a second price of the product for the return of the product or the sell back of the product, wherein the second price is greater than the first price.

9. The computer program product of claim 8, wherein the method further comprises the steps of:
    the computer system selecting a range of usage from multiple predefined ranges of usage; and the computer system determining that the usage of the product is included in the selected range of usage,
wherein the step of determining the first price includes the computer system selecting the first price from multiple prices respectively associated with the predefined ranges of usage, based on the usage of the product is included in the selected range.

10. The computer program product of claim 8, wherein the method further comprises the step of based on the data specifying the usage of the product, the computer system determining a frequency of the activities, wherein the step of determining the first price is further based on the frequency of the activities.

11. The computer program product of claim 8, wherein the method further comprises the step of based on the data specifying the usage of the product, the computer system determining types of the activities, wherein the step of determining the first price is further based on the types of the activities.

12. A computer system comprising:
one or more sensors coupled to a product;
an activity monitoring system;
a price determination system;
a central processing unit (CPU);
a memory coupled to the CPU; and
a computer readable storage medium coupled to the CPU, the computer readable storage medium containing instructions that are executed by the CPU via the memory to implement a method of determining a price of the product, the method comprising the steps of:
after a purchase of the product, detecting, by the one or more sensors coupled to the product, a count of activities completed by a usage of the product;
in response to the detecting the count of the activities completed by the usage of the product, sending, by the one or more sensors and to the activity monitoring system, data specifying the usage of the product, the data including the count of the activities completed by the usage of the product as detected by the one or more sensors;
obtaining, by the price determination system and from the activity monitoring system the data specifying the usage of the product;
based on the data specifying the usage including the count of the activities completed by the usage of the product as detected by the one or more sensors, the computer system determining a first price of the product for a return of the product or a sell back of the product;
the computer system receiving a first request from a user of the product to return or sell back the product;
based on the first request being received and in response to the step of determining the first price, the computer system presenting the first price to the user for the return or the sell back of the product;
the computer system receiving an indication from the user that the user decides not to return or sell back the product based on the first request;
subsequent to the step of receiving the indication, the computer system obtaining second data specifying an increased usage of the product; and
based on the second data specifying the increased usage, the computer system determining a second price of the product for the return of the product or the sell back of the product, wherein the second price is greater than the first price.

13. The computer system of claim 12, wherein the method further comprises the steps of:
the computer system selecting a range of usage from multiple predefined ranges of usage; and
the computer system determining that the usage of the product is included in the selected range of usage,
wherein the step of determining the first price includes the computer system selecting the first price from multiple prices respectively associated with the predefined ranges of usage, based on the usage of the product is included in the selected range.

14. The computer system of claim 12, wherein the method further comprises the step of based on the data specifying the usage of the product, the computer system determining a frequency of the activities, wherein the step of determining the first price is further based on the frequency of the activities.

* * * * *